(12) United States Patent
O'Connor et al.

(10) Patent No.: US 7,831,760 B1
(45) Date of Patent: *Nov. 9, 2010

(54) SERIALLY INDEXING A CACHE MEMORY

(75) Inventors: Dennis M. O'Connor, Chandler, AZ (US); Stephen J. Strazdus, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/342,221

(22) Filed: Dec. 23, 2008

Related U.S. Application Data

(63) Continuation of application No. 10/927,682, filed on Aug. 27, 2004, now Pat. No. 7,475,219.

(51) Int. Cl.
*G06F 12/08* (2006.01)

(52) U.S. Cl. .................. 711/3; 711/203; 711/207; 711/209; 711/212

(58) Field of Classification Search ............. 711/207, 711/209, 206, 118
See application file for complete search history.

(56) References Cited

U.S. PATENT DOCUMENTS

| | | | |
|---|---|---|---|
| 5,058,003 A * | 10/1991 | White ................... 711/209 |
| 5,375,214 A | 12/1994 | Mirza et al. |
| 5,586,283 A * | 12/1996 | Lopez-Aguado et al. .... 711/207 |
| 6,253,285 B1 * | 6/2001 | Razdan et al. ........... 711/118 |
| 6,272,595 B1 | 8/2001 | Rosen et al. |
| 6,519,684 B1 | 2/2003 | Moyer |
| 6,643,742 B1 | 11/2003 | Vidwans et al. |
| 6,687,790 B2 | 2/2004 | Zager et al. |
| 6,732,250 B2 | 5/2004 | Durrant |
| 6,976,117 B2 | 12/2005 | Clark et al. |
| 2003/0028746 A1 * | 2/2003 | Durrant ................. 711/206 |

* cited by examiner

*Primary Examiner*—Tuan V. Thai
*Assistant Examiner*—Yong Choe

(57) ABSTRACT

A method includes indexing a translation table stored in memory with a first index of a virtual address corresponding to a first memory region size by querying the translation table at first locations associated with the first index. Indexing the translation table with a second index of the virtual address corresponding to a second memory region size by querying the translation table at second locations associated with the second index. The translation table includes translations for mapping address tags of the virtual address to physical addresses. The first index is different than the second index, and the first memory region size is different than the second memory region size.

3 Claims, 5 Drawing Sheets

SERIALLY INDEXING A CACHE MEMORY

CROSS-REFERENCE TO RELATED APPLICATIONS

This application is a continuation application Ser. No. 10/927,682, filed Aug. 27, 2004. The disclosure of the above application is incorporated herein by reference in its entirety.

BACKGROUND

The present invention relates generally to memory devices, and more particularly to cache memories. A cache memory is a random access memory that buffers data from a main memory. A cache memory is typically employed to provide high bandwidth memory accessing to a processor by storing selected locations of the main memory. A typical cache memory contains a memory array organized into a set of cache blocks, often referred to as cache lines. A cache line can be addressed using an address tag that identifies a main memory location corresponding to that cache line.

Many computer systems today use virtual memory systems to manage and allocate memory to various processes running within the system. An operating system (OS) maps the virtual address (VA) space for each process to the actual physical address (PA) space for the system. Mapping from a physical address to a virtual address is typically maintained through the use of page tables.

One way in which the performance of a processor is improved is through use of a multiple-stage pipeline architecture, in which various pipeline resources, such as caches, buffers, arrays, and the like may be used to more efficiently execute instructions. One such pipeline resource that improves use of virtual memory systems is a translation lookaside buffer (TLB). A TLB is a relatively small cache memory in a processor pipeline which caches part of the system's virtual address to physical address translations. Specifically, a few elements of the translation set are stored in the TLB that the processor can access extremely quickly.

It is common for TLBs to be organized in a set-associative manner. In operation, control logic for a set-associative TLB constructs an index for the TLB from information including bits from the virtual address of a request received from a processor, and checks to see if the needed translation is present. A translation is present if one of the currently valid entries at the presented index has a tag that matches appropriate bits of the virtual address presented. Further, the entry may also be required to match other bits corresponding to a processor state, such as a process identifier or address space identifier. If a translation for a particular request is not present in the TLB, a "translation miss" occurs and the address translation is resolved using more general mechanisms. Translations in a TLB typically cover a contiguous naturally-aligned memory region (such as 4 kilobytes (KB) or 1 megabyte (MB)), and the method chosen to construct the index depends on the size of the region covered by the translations.

However, when a system contains translations covering widely varying sizes, it is impossible to create a single index that would efficiently handle all the different sizes. For example, a typical OS uses both 4 KB and 1 MB translation regions, represented by 4 KB and 1 MB page table entries, respectively. Typically, the 1 MB page table entry is broken down into multiple 4 KB TLB entries, or two separate TLBs (one for 4 KB entries and one for 1 MB entries) are used, or a fully-associative TLB is used. None of these alternatives is efficient, as each suffers from problems including higher miss rates, wasted cache space, and excessive power consumption.

Accordingly, a need exists for improved cache mechanisms.

DETAILED DESCRIPTION

Figure 1:
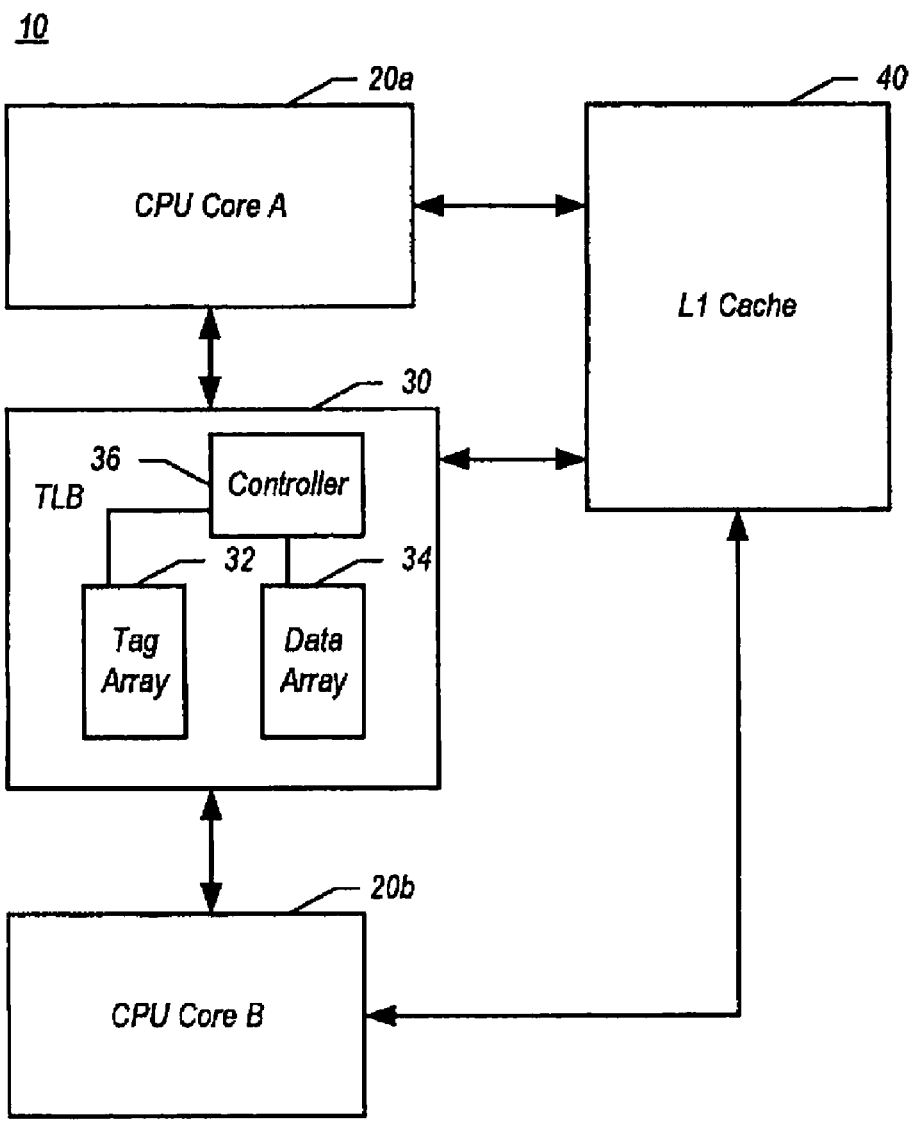
FIG. 1 is a block diagram of a portion of a system in accordance with one embodiment of the present invention.

Referring to FIG. 1, shown is a block diagram of a portion of a system in accordance with one embodiment of the present invention. More specifically, FIG. 1 shows a multicore processor 10, such as a chip multiprocessor (CMP), that includes multiple processor cores. As shown in FIG. 1, a first processor core (i.e., central processing unit (CPU) Core A) 20a and a second processor core (i.e., CPU Core B) 20b may be present. Of course, in other embodiments additional processor cores may be present, or a single core processor may be used.

In order to access data and instructions more efficiently, processor 10 may include several memories internal to the processor package. Such memories may include a level 1 (L1) cache 40. L1 cache 40 may be a static random access memory (SRAM) that provides high-speed access to data and instructions.

As further shown in FIG. 1, processor 10 may include a TLB 30. TLB 30 similarly may be a SRAM, and may be used to store VA to PA translations for efficient access by processor cores 20a and 20b. As shown in FIG. 1, TLB 30 may include a tag array 32 that includes address tags that may be searched to access corresponding entries of a data array 34 that includes physical address translations. While shown in the embodiment of FIG. 1 as including separate tag and data arrays, it is to be understood that the scope of the present invention is not so limited, and in certain embodiments tag and data portions may be stored in a single array. Further shown in FIG. 1, TLB 30 includes a controller 36. Controller 36 may include hardware and/or software to control operation of TLB 30. For example, controller 36 may construct one or more indexes for use in indexing tag array 32 and data array 34 or a combined array including tags and data, in certain embodiments.

As shown in FIG. 1, processor cores 20a and 20b may be coupled both to TLB 30 and L1 cache 40 to provide addresses thereto and receive data therefrom. If a desired address translation is not present in TLB 30, a page walk mechanism may be invoked in which case the address or addresses of the translation table entries used to determine the translation are provided to L1 cache 40 to determine if the requested translation table entry or entries are present therein. If such data is not present in either location, the request may be passed to lower levels of the memory hierarchy. While not shown in FIG. 1, additional cache memories may reside between processor 10 and slower memory hierarchy components, such as main memory and mass storage. For example, certain embodiments may include a level 2 (L2) or other cache. Once the translation table entries are retrieved from the memory hierarchy they are used to determine the translation, which may then be stored in the TLB.

Various embodiments of the present invention may be used in a cache memory, for example, a TLB, such as a direct-mapped or set-associative cache, although the scope of the present invention is not so limited. Control logic associated with the cache may construct a series of indexes, one for each size of translation that may be present within the cache. Then, each of the indexes may be presented to the cache serially. The requested translation is found when an entry at one of the presented indexes has an address tag that matches the presented virtual address, and also is marked as being the size translation for which the index was generated.

Figure 2:
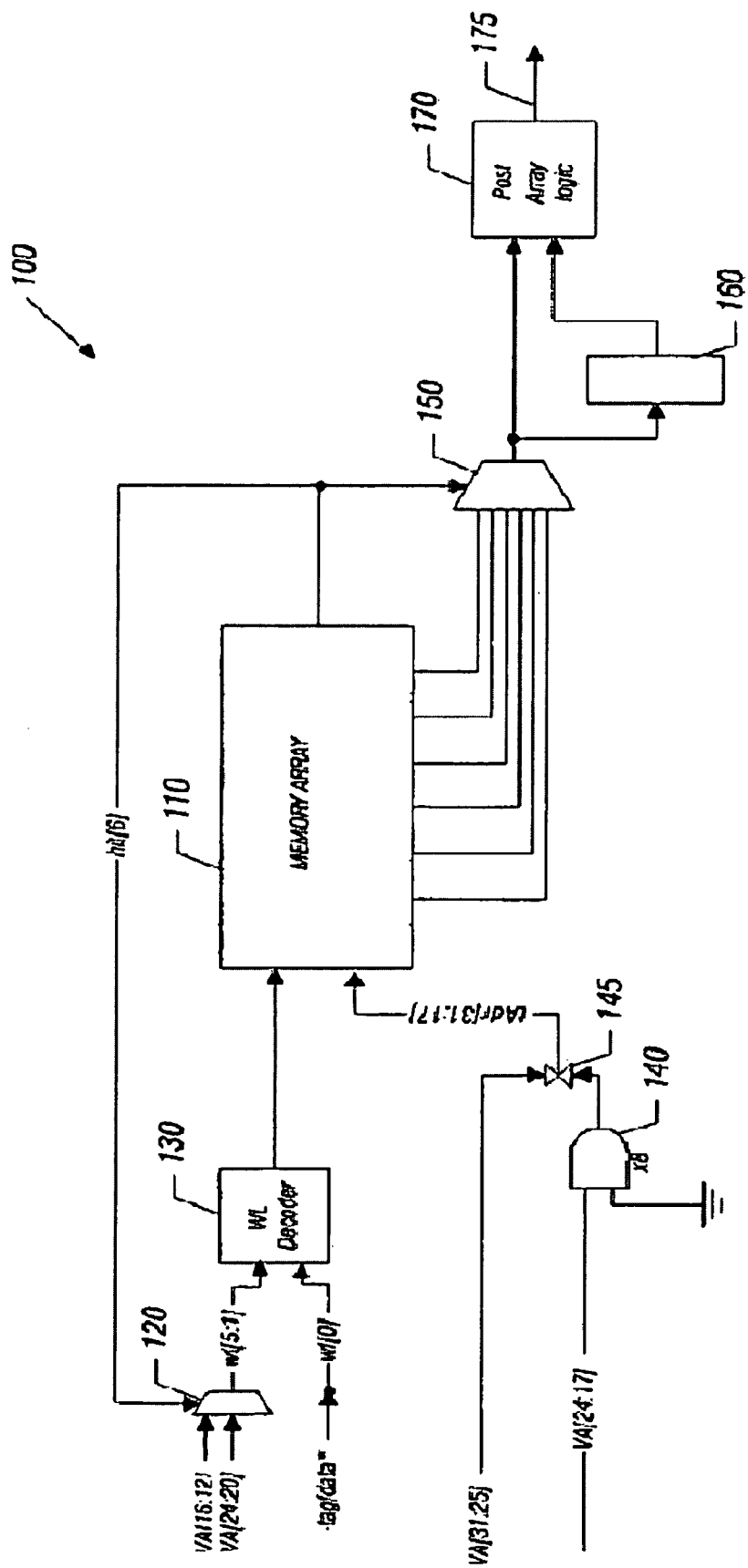
FIG. 2 is a block diagram of a cache memory and controller logic in accordance with one embodiment of the present invention.

Referring now to FIG. 2, shown is a block diagram of a cache memory and controller logic in accordance with one embodiment of the present invention. More specifically, FIG. 2 shows a TLB and related controller logic (generically TLB 100). As shown, TLB 100 includes a cache memory array 110. While the organization of such a memory array may take different forms, in some embodiments, it may be an N-way set associative memory array. For example, memory array 110 may be a six-way set associative memory.

Specifically, in the embodiment of FIG. 2 memory array 110 may be organized as a 192 entry six-way memory array. Furthermore, the entries may be stored across two word lines, namely a first word line that includes a tag portion and data and a second word line that includes remaining data. That is, each entry may include a "tag+data" line and a "rest-of data" line. In one embodiment, odd lines may contain "tags+data", and even lines contain the "rest-of data". If a "tag+data" line of an entry is found in line 2N, then the "rest-of" line for the entry is in line 2N+1. Such an arrangement may enhance array efficiency. However, TLB 100 may be arranged in different manners in other embodiments.

Entries within memory array 110 are accessed using an index portion and a tag portion of a virtual address. More specifically, a high order group of bits of a virtual address may be used to provide the address tag, while a low order group of bits may be used as an index into memory array 110.

TLB 100 may store translations for 4 KB pages and 1 MB sections, with 64 KB pages and 16 MB super-sections converted down to 4 KB and 1 MB entries, respectively. In order to allow a single set-associative TLB to efficiently store both the 4 KB and 1 MB translations in any entry, the TLB may be searched twice: once for a 4 KB entry using a first portion of a VA (e.g., VA bits 16 through 12, referenced herein generically as VA[X:Y]) to generate the index, and then for a 1 MB entry using a second portion of the VA (e.g., VA[24:20]) to generate the index.

Thus as shown in FIG. 2, certain bits of the virtual address may be used as an index into memory array 110. In the embodiment of FIG. 2, for a 4 KB entry, VA[16:12] may be used to index memory array 110, while for a 1 MB entry, VA[24:20] may be used to index memory array 110. Of course, in other embodiments different entry sizes may be present. For example, in one embodiment 64 KB entries may be indexed using VA[20:16]. These virtual address bits may be applied to a set select logic and multiplexer 120 that provides a group of high order bits (i.e., W[5:1]) to a word line decoder 130. Word line decoder 130 may also receive a lowest order bit (i.e., W[0]) from a tag/data control line that acts as a line identifier bit to indicate whether a first line or a second line of an entry of memory array 110 is to be accessed. Together, outputs of set select logic 120 and the line identifier bit are decoded by word line decoder 130 to drive the selected word lines of the appropriate set of memory array 110.

Furthermore, memory array 110 receives an address tag that is formed using VA[31:17]. More specifically, as shown in FIG. 2, the highest order virtual address bits (i.e., VA[31:25]) are provided to a coupler 145, where they are coupled to selected ones of VA[24:17]. However, VA[24:17] are first input into a logic operator 140, which may be a plurality of AND gates. As shown, VA[24:17] may be ANDed together with a logic low level such that the VA bits corresponding to a given index are zeroed out. For example for a 1 MB index, VA[24:20] may be zeroed out using logic operator 140. The resulting output from logic operator 140 may be coupled with the high order VA bits at coupler 145 and then provided to memory array 110 as address tag tAdr[31:17] to determine whether a tag match occurs.

Sense amplifiers within memory array 110 may compare the different ways of the selected set to the address tag received as tAdr[31:17]. The sense amplifiers may also use other information in the compare operation, such as the size of the entry, so that a 4 KB entry does not generate a match when searching for a 1 MB entry. Additionally, other information, like an address space identifier or process identifier, may be used to determine if a match has occurred. If a tag match occurs, the matching word line may be then selected by multiplexer 150. Multiplexer 150 may provide the resulting data to a buffer 160 and/or a post array logic 170. More specifically, for data within a first line of an entry, buffer 160 may be enabled to store the data until data from the second line of the entry is received and inserted into post array logic 170. There the contents of the two lines forming the entry may be merged, and the full entry may be output via an output line 175.

Figure 3:
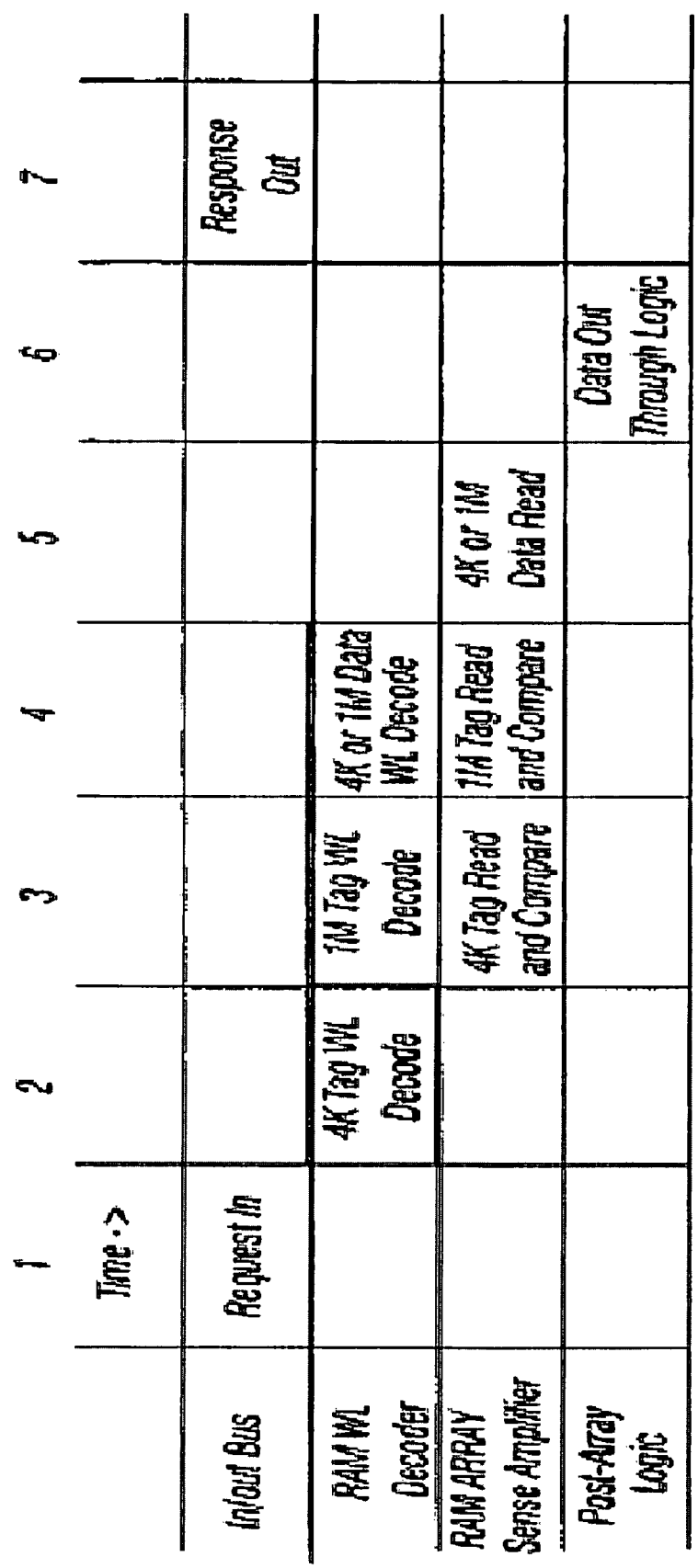
FIG. 3 is a timing diagram illustrating operation of a TLB in accordance with one embodiment of the present invention.

Referring now to FIG. 3, shown is a timing diagram illustrating operation of a TLB in accordance with one embodiment of the present invention. While FIG. 3 illustrates a TLB that uses multiple clock cycles to retrieve data such as used in a pipelined TLB, the scope of the present invention is not so limited. As shown in FIG. 3, the timing diagram may begin with receipt of an input request (i.e., a Request In) from a processor or other source. The timing diagram of FIG. 3 will be discussed with reference to TLB 100 of FIG. 2, although similar operation may be effected on another TLB or other cache memory. The request may be received on an input/output (I/O) bus coupled to TLB 100 at a time corresponding to a first cycle.

Next, at cycle 2, word line decoder 130 may decode VA[16:12] to drive the word line of the appropriate set for a 4 KB entry look-up. At cycle 3, word line decoder 130 may decode other bits of the VA (i.e., VA[24:20]) to select the appropriate set for a 1 MB look-up into memory array 110. At the same time, the decoded word lines of the selected set (determined in cycle 2) are driven into memory array 110 to read the six entries from the set that would be appropriate if the translation is included in a 4 KB entry in TLB 100. Sense amplifiers in memory array 110 may compare the address tags and other information to determine a tag match. For example, in certain embodiments, an address space identifier, core mode, or other processor identifier may be present. Furthermore, a size tag or identifier for the translation stored at the corresponding entries may be compared to a size tag for the given index. By the end of the cycle, the sense amplifiers may indicate which, if any, of the entries match. Note that if there are any 1 MB entries in this set, they would not generate a match.

Then at a fourth cycle, a 4 KB or 1 MB portion for the second half of the desired entry may be decoded; wordline decoder 130 uses the 4 KB index if a 4 KB match was found, and a 1 MB index otherwise. At the same time, memory array 110 may compare address tags to determine whether a match exists for the 1 MB tag obtained in cycle 3. More specifically, in the fourth cycle, the decoded word lines from the previous cycle are driven into memory array 110 to read the six entries from the set that would be appropriate if the translation is satisfied by a 1 MB entry in TLB 100. The sense amplifiers in memory array 110 may compare the address tags and other information (as described above) and by the end of the cycle indicate which, if any, of the entries match. Note that if there were any 4 KB entries in this set, they would not generate a match. Furthermore, if there was a match in the previous cycle (among the 4 KB entries), a match in this cycle may be ignored. While the 1 MB entries are being read and checked, word line decoder 130 may decode its inputs to access a second half of the desired entry.

Then in cycle 5, if a match exists, the 4 KB or 1 MB entry may be read out of memory array 110 using the sense amplifiers. In clock cycle 6, the two word lines forming the requested entry may be combined and transmitted from post array logic 170. Such data may be provided to the requesting processor in cycle 7 as Response Out data.

While described with this particular implementation in the embodiment of FIG. 3, it is to be understood that the scope of the present invention is not so limited, and in other embodiments, different methods of requesting and retrieving data in a TLB or other cache memory may be implemented.

Figure 4:
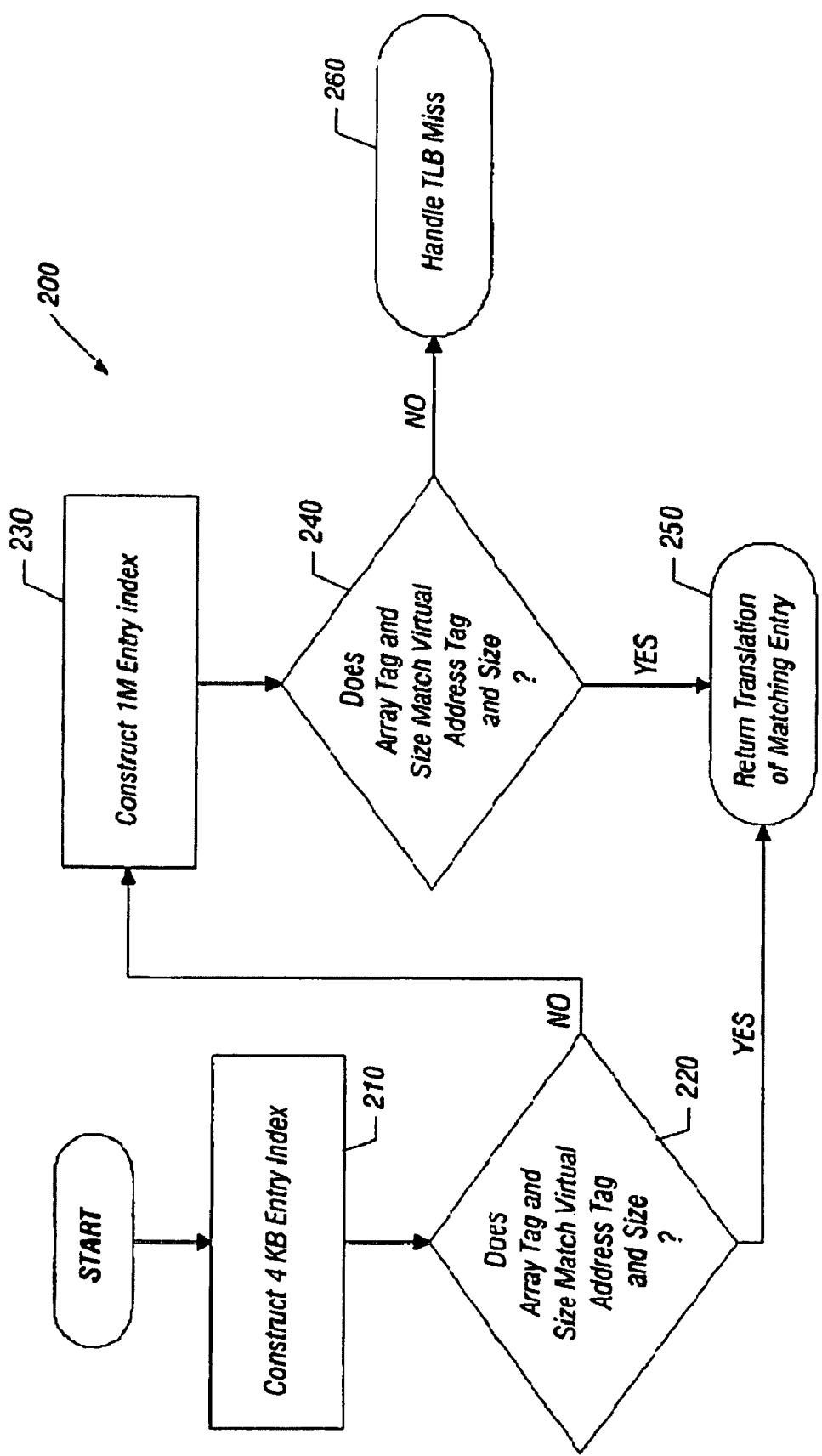
FIG. 4 is a flow diagram of a method in accordance with one embodiment of the present invention.

Referring now to FIG. 4, shown is a flow diagram of a method in accordance with one embodiment of the present invention. More specifically, FIG. 4 shows a method 200 of accessing a TLB that stores address translations of multiple page sizes. In the embodiment of FIG. 4, a TLB may store translations of 4 KB pages and 1 MB pages, although the scope of the present invention is not so limited. Furthermore, for ease of illustration, method 200 is illustrated for a 32-entry non-pipelined direct-mapped TLB although it is to be understood that different cache memories, such as set-associative structures may be equally suitable.

As shown in FIG. 4, a first index, namely a 4 KB entry index, may be constructed (block 210). More specifically, VA[16:12] may be used to construct the index. Then the TLB may be queried to determine whether an address tag stored in the entry of the array corresponding to the indexed location matches the virtual address tag (i.e., VA [31:17]) and is of the same size as the requested translation (i.e., a 4 KB translation) (diamond 220). For example, size tag information may be located in the translations that indicates what size region the translation covers (and therefore which index they can "match" on), thus allowing different size translations to efficiently share the same storage. In one embodiment, the size tag information may be a single bit to indicate if a first size translation or a second size translation is present (e.g., a 4 KB size or a 1 MB size). However, in embodiments that use translations of more than two sizes, multiple size tag bits may be present. For example, two size tag bits may be used to identify translations of four different sizes, or to identify three different sizes with a fourth value used to indicate an invalid entry, and so forth. If a match exists, the translation of the matching entry may be returned (block 250), for example, to a requesting processor.

If no match is found in diamond 220, control may pass to block 230, where a second index, namely a 1 MB entry index, may be constructed. For example, VA[24:20] may be used to construct the index. At diamond 240, the TLB may be queried to determine whether an address tag stored in the entry of the array corresponding to the indexed location matches the virtual address tag (i.e., VA[31:17]) and is of the same size as the requested translation (i.e., a 1 MB translation). If no matching entry exists, a TLB miss may be handled (block 260). For example, a page miss handler may be initiated to cause a page table walk, for example. If instead at diamond 240 a match is found, the translation for the matching entry may be returned (block 250).

Because multiple queries to the same cache may be performed, results may be returned after a variable latency. Thus some embodiments may be suitable for a second-level TLB or cache, although other embodiments may be used in a first-level cache. In certain embodiments, multiple indexes may be pipelined for higher throughput, and can utilize "early completion" logic to speed delivery of results and save power when an index generated early in the process finds the desired translation. For example, if a 4 KB index generated first corresponds to an entry having a matching address tag, the overhead associated with constructing additional indexes for other memory size regions may be avoided, reducing overhead and power consumption. In some embodiments, a replacement algorithm for a cache in accordance with an embodiment of the present invention may use the size of the entries in determination of a replacement decision.

In such manner, a smaller, more power-efficient TLB may be utilized in certain embodiments without sacrificing performance. Further, better performance may be achieved (by having fewer TLB misses) with a TLB in accordance with an embodiment of the present invention, particularly when an OS uses translation entries of more than one size for VA-to-PA translations. For example, a LINUX™ or WINDOWS CE™ OS may use translations that cover different size regions of memory.

Embodiments may be implemented in a program. As such, these embodiments may be stored on a storage medium having stored thereon instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMS), erasable programmable read-only memories (EPROMs), electrically erasable programmable read-only memories (EEPROMs), flash memories, a phase change or ferroelectric memory, a silicon-oxide-nitride-oxide-silicon (SONOS) memory, magnetic or optical cards, or any type of media suitable for storing electronic instructions. Similarly, embodiments may be implemented as software modules executed by a programmable control device, such as a computer processor or a custom designed state machine.

Figure 5:
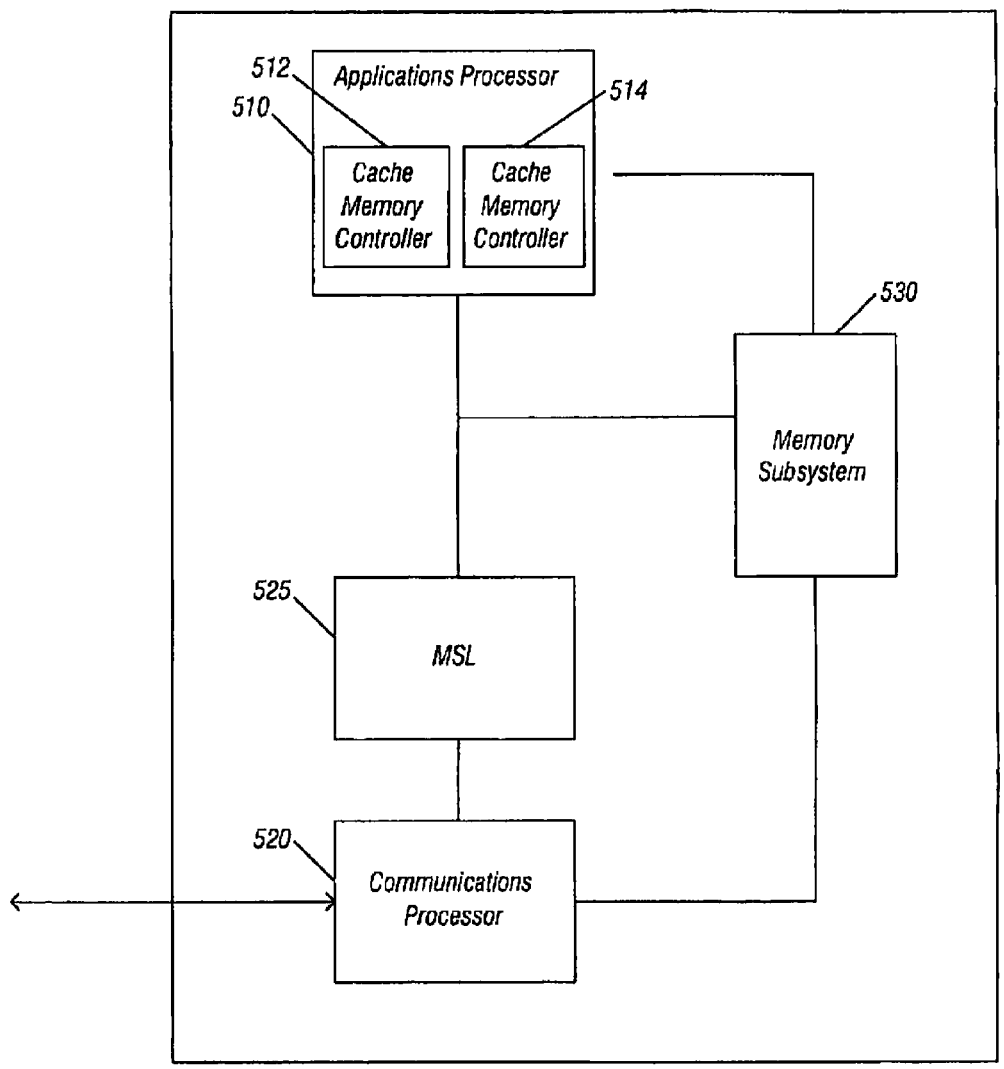
FIG. 5 is a block diagram of a wireless device with which embodiments of the present invention may be used.

Referring now to FIG. 5, shown is a block diagram of a wireless device with which embodiments of the invention may be used. As shown in FIG. 5, in one embodiment wireless device 500 includes an applications processor 510, which may include a general-purpose or special-purpose processor such as a microprocessor, microcontroller, application specific integrated circuit (ASIC), a programmable gate array (PGA), and the like. Applications processor 510 may be used to execute various applications such as data processing functions, modification and manipulation of digital content and the like. As shown in FIG. 5, applications processor 510 may include a cache memory controller 512 and a cache memory 514 in accordance with an embodiment of the present invention. In one embodiment, applications processor 510 may be a 32-bit processor, such as an XSCALE™ processor, available from Intel Corporation, Santa Clara, Calif.

Applications processor 510 may be coupled to a communications processor 520, which may be a digital signal processor (DSP) based on a micro signal architecture, via an internal bus, which may include a scalable link 525 (such as a mobile scalable link (MSL)), which may be formed of a plurality of gating devices to scalably transfer data between the processors. A memory subsystem 530 may be coupled to both applications processor 510 and communications processor 520, in certain embodiments. Memory subsystem 530 may include both volatile and non-volatile memory, such as static RAM (SRAM), dynamic RAM (DRAM), flash memories, and the like. While shown in FIG. 5 as separate components, it is to be understood that in other embodiments two or more of the components may be integrated into a single device, such as a single semiconductor device.

It is to be understood that communications processor 520 may include various functionalities including wireless communication with external sources. For example, communications processor 520 may include a wireless interface (which in turn may have an antenna which, in various embodiments, may be a dipole antenna, helical antenna, global system for wireless communication (GSM) or another such antenna). In certain embodiments, the wireless interface may support General Packet Radio Services (GPRS) or another data service. GPRS may be used by wireless devices such as cellular phones of a 2.5 generation (G) or later configuration. While shown in FIG. 5 as being a wireless device, it is to be understood that the scope of the present invention is not so limited. For example, a cache memory in accordance with an embodiment of the present invention may be located in a personal computer, server computer, notebook computer or other such system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

indexing a translation table stored in memory with a first index of a virtual address corresponding to a first memory region size by querying the translation table at first locations associated with the first index;

indexing the translation table with a second index of the virtual address corresponding to a second memory region size by querying the translation table at second locations associated with the second index, wherein the translation table includes translations for mapping address tags of the virtual address to physical addresses, wherein the first index is different than the second index, and wherein the first memory region size is different than the second memory region size;

determining whether an address tag of the virtual address corresponding to the first index matches an address in the translation table, wherein the indexing of the translation table with the second index is performed when the address tag of the virtual address does not match the address in the translation table; and determining whether a size tag of a translation lookaside buffer address matches the first memory region size, wherein the indexing of the translation table with the second index is performed when the size tag does not match the first memory region size.

2. A method comprising:

indexing a translation table stored in memory with a first index of a virtual address corresponding to a first memory region size by querying the translation table at first locations associated with the first index;

indexing the translation table with a second index of the virtual address corresponding to a second memory region size by querying the translation table at second locations associated with the second index, wherein the translation table includes translations for mapping address tags of the virtual address to physical addresses, wherein the first index is different than the second index, and wherein the first memory region size is different than the second memory region size;

comparing an address tag of the virtual address to a first address tag of a first array of the translation table;

comparing an address size of the virtual address to a first address size associated with the first array;

determining the second index when at least one of the address tag of the virtual address does not match the first address tag and the address size of the virtual address does not match the first address size;

comparing the address tag of the virtual address to a second address tag of a second array of the translation table;

comparing the address size of the virtual address to a second address size of the translation table that is larger than the first address size; and returning a physical address when the address tag of the virtual address matches the second address tag and the address size of the virtual address matches the second address size.

3. The method of claim 2 further comprising searching each entry in the translation table for a match of the address tag of the virtual address and of the address size of the virtual address when the address tag of the virtual address does not match the first address tag and the second address tag.

* * * * *